(12) United States Patent
Kemsley et al.

(10) Patent No.: US 7,197,803 B2
(45) Date of Patent: Apr. 3, 2007

(54) FIXTURE AND METHOD FOR ALIGNING A TRANSITION

(75) Inventors: Andrew Daesung Kemsley, Sugar Land, TX (US); Thomas James Ronge', Cherry Hill, NJ (US)

(73) Assignee: Siemens Power Generation, Inc., Orlando, FL (US)

( * ) Notice: Subject to any disclaimer, the term of this patent is extended or adjusted under 35 U.S.C. 154(b) by 99 days.

(21) Appl. No.: 10/681,396

(22) Filed: Oct. 8, 2003

(65) Prior Publication Data

US 2005/0076490 A1  Apr. 14, 2005

(51) Int. Cl.
*B23Q 3/00* (2006.01)

(52) U.S. Cl. ............... 29/407.05; 29/407.09; 29/407.1; 29/464; 29/559; 29/281.1; 29/271; 29/709; 269/47; 269/86; 269/909

(58) Field of Classification Search ............. 29/407.01, 29/407.05, 407.08, 407.09, 407.1, 525.02, 29/559, 705, 709, 714, 720, 721, 434, 464, 29/281.1, 271, 272, 283; 73/865.9, 866.5, 73/119 R, 118.1; 60/796, 798; 33/710, 501.02, 33/501.05, 655, 549, 555, 558, 503; 269/47, 269/48.1, 86, 95, 156, 909
See application file for complete search history.

(56) References Cited

U.S. PATENT DOCUMENTS

| 4,060,904 A | 12/1977 | Hiss |
| 4,196,522 A | 4/1980 | Bell et al. |
| 4,367,594 A | 1/1983 | Murray, Jr. |
| 4,502,233 A | 3/1985 | Boitz et al. |
| 4,718,170 A | 1/1988 | Wheeler |
| 5,123,812 A | 6/1992 | Groenendaal, Jr. |
| 5,228,181 A | 7/1993 | Ingle |
| 5,513,547 A | 5/1996 | Lovelace |
| 6,116,013 A | 9/2000 | Moller |
| 6,141,862 A | 11/2000 | Matsui et al. |
| 6,170,140 B1 | 1/2001 | Deavers |
| 6,360,418 B1 | 3/2002 | Freeman et al. |
| 6,442,946 B1 | 9/2002 | Kraft et al. |

*Primary Examiner*—Jermie E. Cozart

(57) ABSTRACT

Aspects of the invention relate to a fixture and a method to assist in the alignment of the inlet end of a transition duct and a combustor component in a turbine engine. Among other things, the fixture can include a flange adapted for mounting to a combustor component, an elongated mandrel, and a plurality of radially extendable jaws. After mounting the fixture to a combustor component, the jaws can engage an inner peripheral surface of a transition so as to properly align the transition with a target axis of alignment. The fixture can be configured to measure the size of any shims needed at the base of the flexible support bracket. Further, the fixture can also include various gauges to validate the alignment of the inlet end of the transition.

20 Claims, 7 Drawing Sheets

FIXTURE AND METHOD FOR ALIGNING A TRANSITION

FIELD OF THE INVENTION

The invention relates in general to turbine engines and, more particularly, to an apparatus for aligning a transition duct with the combustor section of a turbine engine and an associated method.

BACKGROUND OF THE INVENTION

Turbine engines generally include three sections: a compressor section, a combustor section and a turbine section. In some turbine engine designs, a duct, known as a transition, extends between the combustor section and turbine section. The transition serves many purposes, one of which is to direct the hot gases produced in the combustor section to the turbine section.

Precise alignment between the inlet end of the transition and the combustor section is critical for proper engine operation. Earlier alignment methods were crude, time consuming, labor intensive and required manual mathematical calculations. Consequently, rework operations were common when such methods were employed.

Thus, one object according to aspects of the present invention is to provide an apparatus to facilitate the process of aligning the inlet end of the transition with respect to a combustor component of a turbine engine. Another object according to aspects of the present invention is to consolidate many of the instruments used in prior alignment processes into a single apparatus. Yet another object according to aspects of the present invention is to eliminate the need for manual support of the weight of the transition during the alignment process. A further object according to aspects of the present invention is to provide an apparatus that can validate the alignment of the transition. Still another object according to aspects of the invention is to provide a method for aligning a transition duct with a component of the combustor section of a turbine engine. These and other objects according to aspects of the present invention are addressed below.

SUMMARY OF THE INVENTION

Aspects of the invention relate to a fixture for aligning the inlet end of a transition with a combustor component in a turbine engine. The fixture includes a flange adapted for mounting to a combustor component, an elongated mandrel having proximal and distal ends, and a plurality of radially extendable jaws coupled to the distal end of the mandrel.

The flange can include at least one protrusion for centering the fixture on a combustor component. The mandrel is selectively coupled to and extends away from the flange along a target axis of alignment. One manner in which the mandrel can be selectively coupled to the flange is by a carriage attached to the proximal end of the mandrel. The carriage can be selectively coupled to the flange such that the mandrel can be held in one of a fixed relation or a sliding relation to the flange. The carriage can be held in fixed relation to the flange by at least a bolt. The fixture can further include a pair of rails secured to the flange. Accordingly, the carriage can slidably engage the pair of rails.

Further, each of the plurality of jaws includes an inner tip and an outer tip. The outer tips are radially extendable in a cooperative manner such that each of the outer tips move a substantially equal radial distance from the target axis of alignment. Thus, the outer tips can engage an inner peripheral surface of a transition so that the transition is properly located to the target axis of alignment. In one embodiment, a plate can be secured to the distal end of the mandrel, and the plurality of radially extendable jaws can be movably retained on the plate. The plurality of radially extendable jaws can be biased radially inward.

The fixture can further include a first positional gauge secured to the flange so as to substantially engage at least a portion of the carriage such that the first dial indicator can measure movement of the carriage. In addition, the fixture can include a first control rod extending longitudinally through the mandrel. The first control rod can have a proximal end and a distal end. A first user control knob can be connected to the proximal end of the first control rod, and a flared fitting can be connected to the distal end of the first control rod. Thus, the inner tips of the plurality of radially expandable jaws can engage at least the flared fitting. Actuation of the first user control knob can cause axial movement of the first control rod.

The fixture can also include a second control rod extending longitudinally through the mandrel. The second control rod can have a proximal end and a distal end. A second user knob can be connected to the proximal end of the second control rod. At least a portion of the second control rod can be disposed substantially coaxially within the first control rod. Further, at least a portion of the second control rod can be rotatable. A second positional gauge can be attached to the distal end of the second control rod. The second positional gauge can be circumferentially rotatably positioned so as to sweep inside of the transition.

Other aspects of the invention relate to a method of aligning the inlet end of a transition with the combustor section of a turbine engine. The method includes providing a combustor portal, a generally hollow transition duct, and a bracket. The combustor portal has a flange portion transitioning into a hollow body portion. The transition duct has an inlet end, an outlet end, and an inner periphery. The bracket, which extends between the inlet end of the transition and a surface of the combustor section of the turbine engine, supports at least a portion of the inlet end of the transition.

In addition to the above components, a fixture is provided. The fixture has a flange, an elongated mandrel, and a plurality of radially extendable jaws. The flange is adapted for mounting to a corresponding surface on the combustor portal so as to substantially center the fixture on the portal. The elongated mandrel has proximal and distal ends. The mandrel is selectively coupled to and extends away from the flange along a target axis of alignment. The plurality of radially extendable jaws are coupled to the distal end of the mandrel. Each of the plurality of jaws includes an inner tip and an outer tip. The outer tips are radially extendable in a cooperative manner so as to maintain a substantially equal radial distance from the target axis of alignment.

The bracket can be fastened to the transition and the combustor surface so that the bracket can be adjustably positioned. The fixture is secured to the combustor portal by attaching the flange of the fixture to flange portion of the combustor portal such that at least a portion of distal end of the mandrel including the jaws extends beyond the body portion of the combustor portal. Next, the inlet end of the transition is placed over the extending portion of the mandrel. Then, the plurality of jaws radially are extended outward such that each of the outer tips engage the inner periphery of the transition. As a result, the inlet end of the transition is held substantially along the target axis of alignment.

The method can also include the step of measuring the gap between a portion of the bracket and the combustor surface as well as the step of installing one or more shims between a portion of the bracket and the combustor surface. Additional steps can include securing the bracket to the combustor surface, radially retracting the plurality of jaws out of engagement with the inner peripheral surface of the transition, and removing the fixture from the combustor component.

In another embodiment of the method according to aspects of the invention, the method can include the steps of: zeroing the first positional gauge; selectively decoupling the carriage from the flange; moving the carriage away from the axis of alignment until the bracket engages the combustor surface; using the first positional gauge to measure the movement of the carriage; and installing one or more shims between the bracket and the combustor surface in accordance with the measurement of the first positional gauge. In such case, the method can further include the steps of: securing the bracket to the combustor surface; radially retracting the plurality of jaws out of engagement with the inner peripheral surface of the transition; and removing the fixture from the combustor component.

DETAILED DESCRIPTION OF EMBODIMENTS OF THE INVENTION

Aspects of the present invention address the drawbacks associated with prior transition alignment techniques. In one respect, aspects of the present invention relate to a fixture that can assist in the process of aligning the inlet end of a transition duct to a combustor component of a turbine engine. Other aspects of the present invention relate to a method of aligning a transition and a combustor component using such a fixture.

Embodiments of the invention will be explained in the context of a transition alignment fixture, but the detailed description is intended only as exemplary. Embodiments of the invention are shown in FIGS. 1–7, but the present invention is not limited to the illustrated structure or application.

Figure 1:
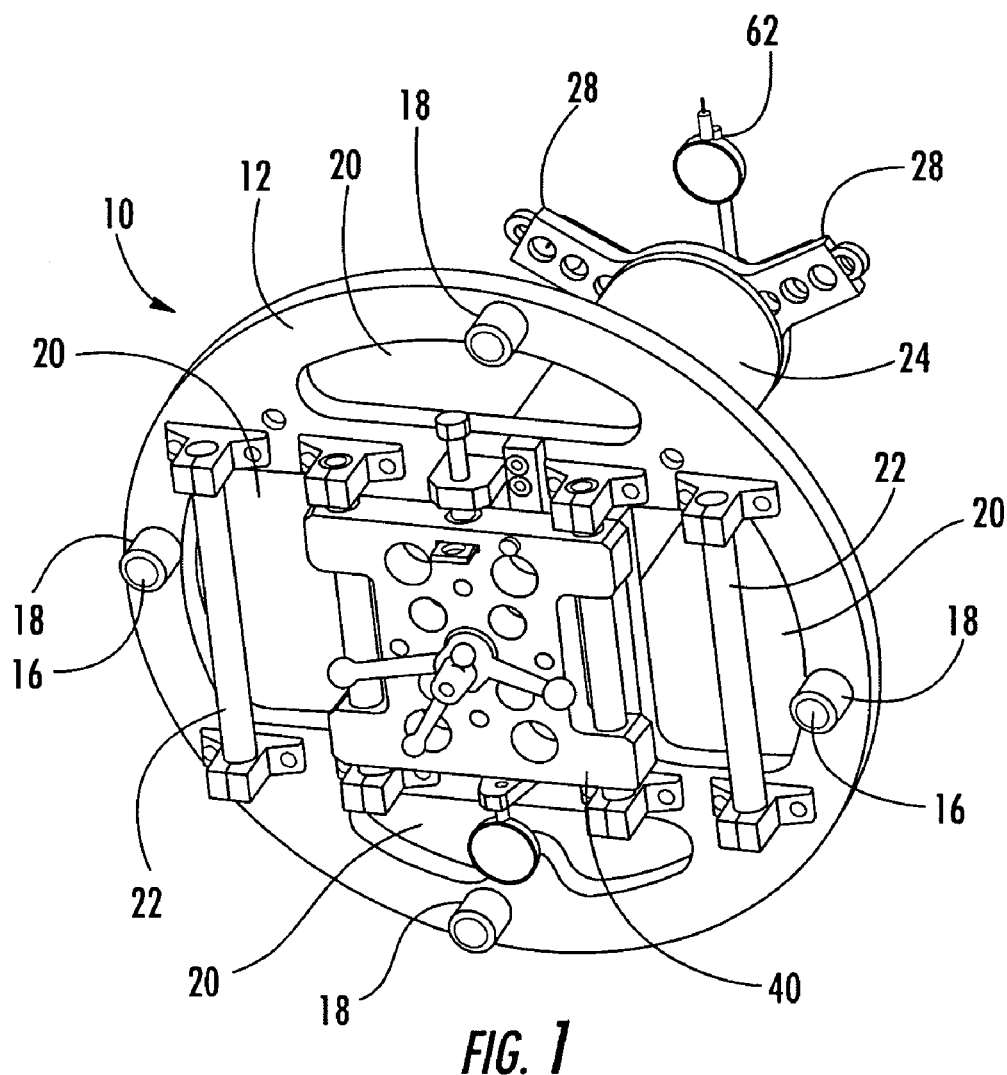
FIG. 1 is an isometric view of a fixture according to aspects of the invention.
Figure 2:
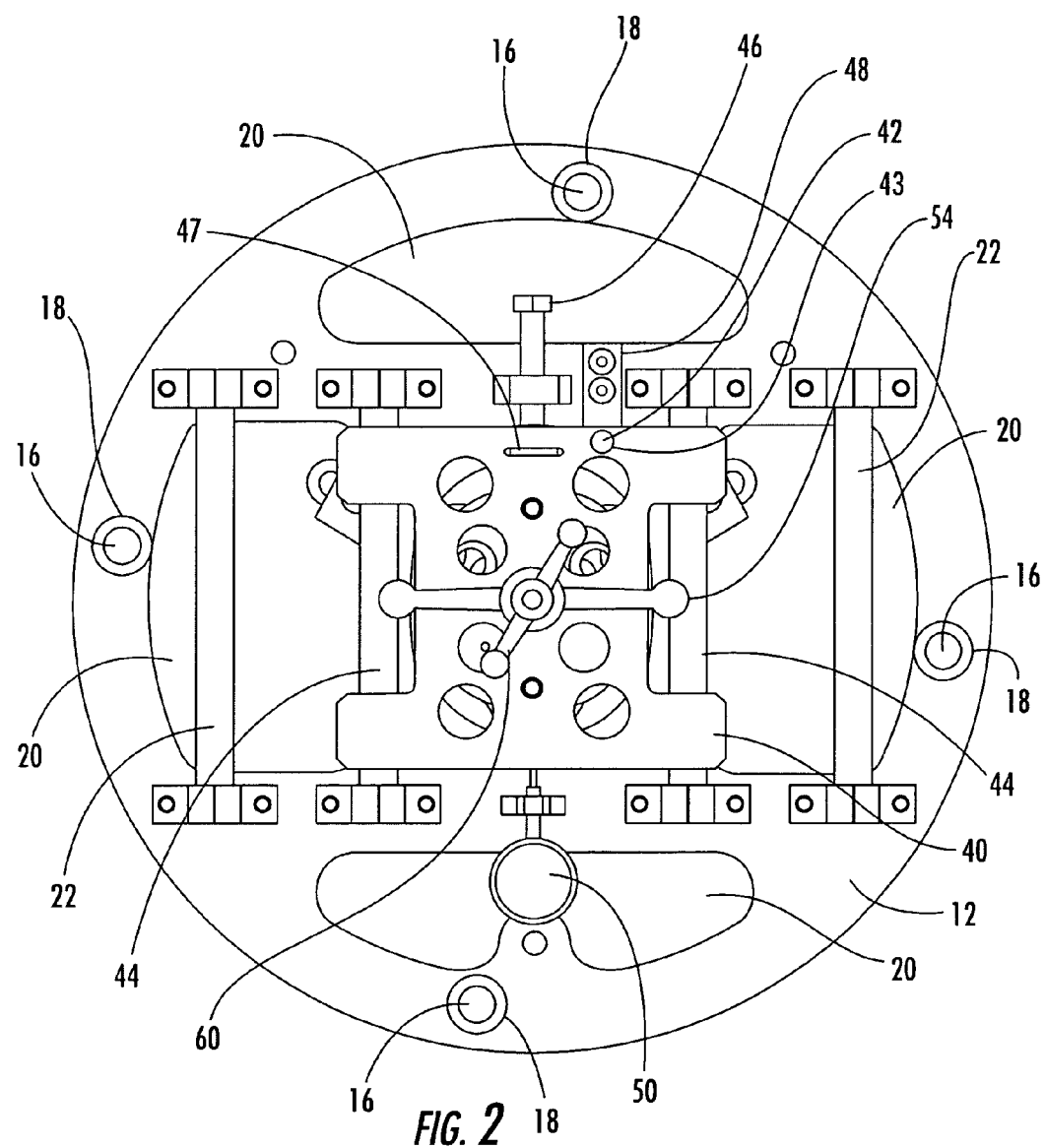
FIG. 2 is a front elevational view of a fixture according to aspects of the invention.
Figure 3:
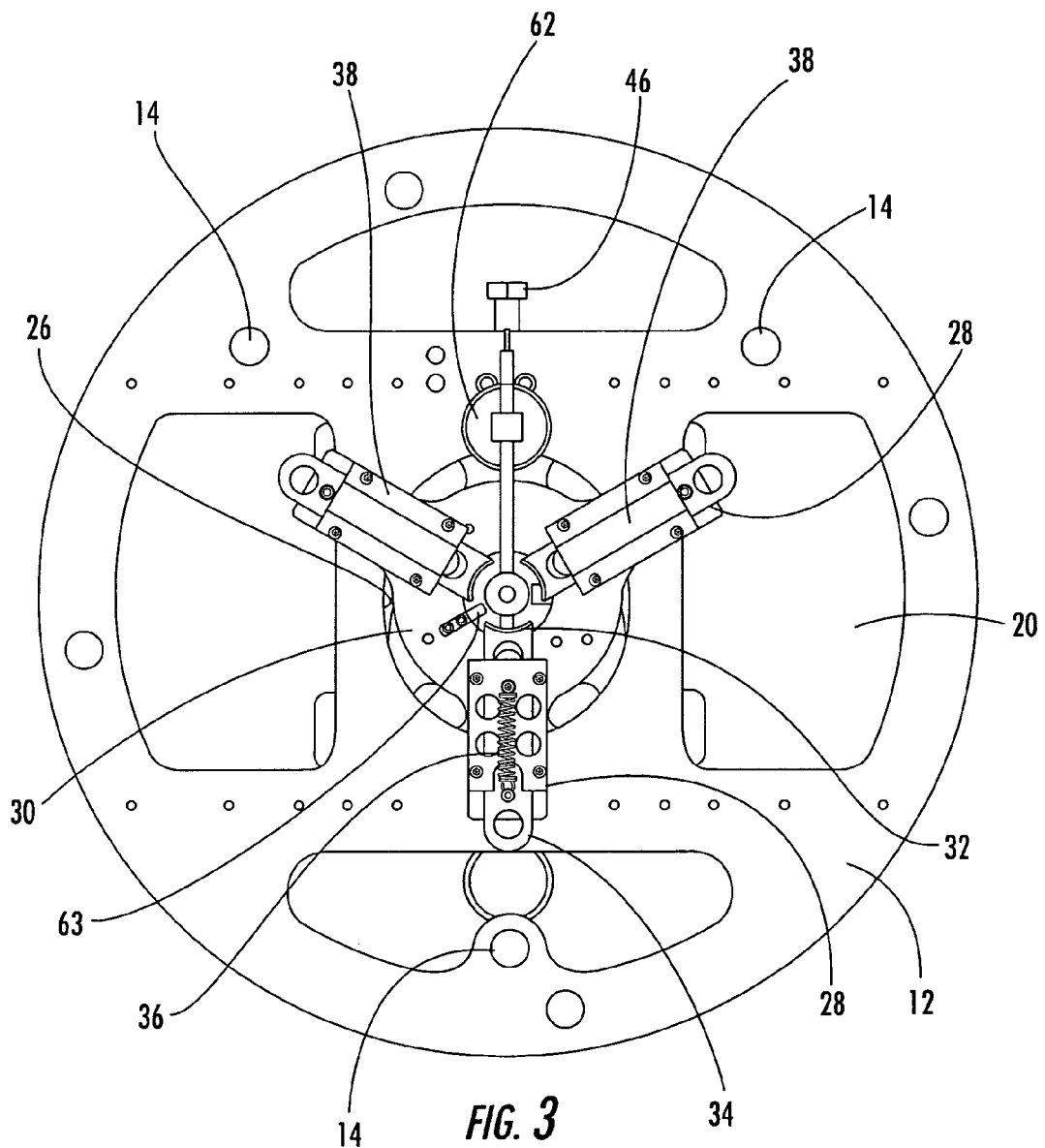
FIG. 3 is a rear elevational view of a fixture according to aspects of the invention.

As shown in FIG. 1, aspects of the present invention relate to a fixture 10 for aligning the inlet end of a transition with the combustor section of a turbine engine. The fixture 10 can include numerous components, each of which will be discussed in turn below.

A fixture 10 according to aspects of the invention can include a flange 12. The flange 12 can be adapted for mounting to a corresponding surface of a combustor component such as the flange on a combustor portal. In general, "adapted for mounting" means that the flange 12 can include one or more features that facilitate the mounting of the fixture 10 to a combustor component. For example, the flange 12 can include at least one projection 14 (FIG. 3) that can assist in substantially centering the fixture 10 on the combustor component. In such case, the flange 12 can have one or more localized raised areas. Such areas can be created by providing a one or more holes in the flange and pressing a reset button into the hole. In one embodiment, the at least one projection 14 can be three reset buttons that are arranged so as to be disposed about a diameter corresponding to a circular recess provided on the mating surface of the combustor component (not shown). Thus, there is only one way for the flange 12 to mate with the combustor component. Alternatively, a substantially continuous circular raised area can be provided on the flange 12 for engaging a circular recess in the combustor component. In any case, such features ensure that the flange 12 and, therefore, the fixture 10 will be centered on the combustor component.

The term adapted for mounting can further mean that one or more mounting holes 16 are provided in the flange 12 so that the flange 12 can be mounted to the combustor component by, for example, bolts or other fasteners. In such case, it is preferred if the mounting holes 16 correspond to a preexisting hole pattern on the combustor portal. If needed, the flange 12 can include bosses 18, spacers, or other hardware to facilitate mounting.

In one embodiment, the flange 12 can include one or more openings 20. It may be desirable to include the openings 20 for several reasons. For example, the openings 20 may be provided to reduce the overall weight of the fixture 10. In addition, the openings 20 can be included to allow a user to view other parts of the fixture 10 or transition that would otherwise be blocked from view. Further, the openings 20 can permit a user to access any of the components downstream of the flange 12. To this end, the openings 20 can be sized such that a user can extend an arm through the opening 20 to access one or more components of the fixture 10. In addition to the openings 20, the flange 12 can have one or more handles 22 associated with it to facilitate movement of the fixture 10.

The flange 12 can have any of a number of shapes such as circular (as shown), polygonal, rectangular, to name a few. Similarly, the flange 12 can be made of any of a variety of materials including metals like tool steel.

Figure 4:
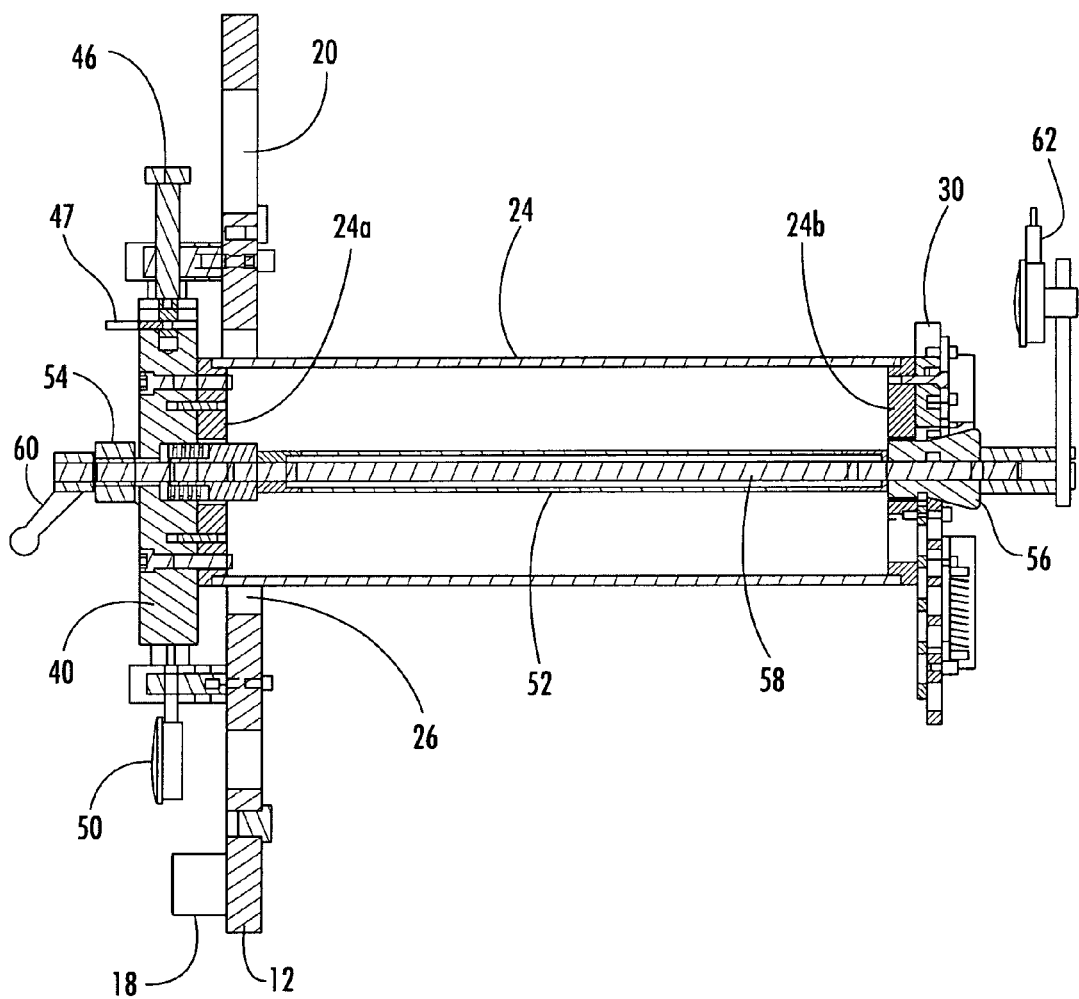
FIG. 4 is a side cross-sectional view of a fixture according to aspects of the invention.

Another component of a fixture 10 according to aspects of the invention can be an elongated mandrel 24, preferably substantially hollow, having a proximal end 24a and a distal end 24b as shown in FIG. 4. The terms proximal and distal used herein refer to the relative location of a particular end of the mandrel 24 or other component with respect to a user. These terms are intended to facilitate discussion without limiting the scope of the invention.

The mandrel 24 can be selectively coupled to and extend away from the flange 12 along a target axis of alignment. The target axis of alignment is the desired axis on which the inlet end of the transition is to be substantially aligned. The target axis of alignment may or may not be the centerline of the portal. The term selectively coupled includes direct as well as indirect coupling between the mandrel 24 and the flange 12. Further, the coupling relationship is selective because, as will be discussed later, there can be at least two relations between the mandrel 14 and the flange 12. The flange 12 can have a generally central opening 26 through which at least a portion of the proximal end 24a of the mandrel 24 can extend.

A fixture 10 according to aspects of the invention can also include a plurality of radially extendable jaws 28. In one embodiment, there are at least three jaws 28. Generally, the radially extendable jaws 28 are coupled, directly or indirectly, to the distal end 24b of the mandrel 24. In one embodiment, a plate 30 can be attached to the distal end 24b of the mandrel 24. In such case, the plurality of radially extendable jaws 28 can be movably retained on the plate 30.

Each jaw 28 can be positioned radially about the target axis of alignment. Each jaw 28 can include an inner tip 32 and an outer tip 34. The jaws 28 can be radially extendable in a cooperative manner such that all of the outer tips 34 move a substantially equal radial distance from the target axis of alignment. Further, each jaw 28 can be biased radially inward, such as by a spring 36, toward the target axis of alignment. A housing 38 may cover at least a portion of each jaw 28 so that the jaws 28 are retained on the plate 30 while being permitted to move radially inward and outward. Though the jaws 28 can be biased radially inward, the application of a radially outward force can overcome the force the spring 36 so as to cause the jaws 28 to move radially outward. The jaws 28 can be single part constructions or multi-part assemblies. In addition, the jaws 28 can be made from a variety of materials such as steel, metals, alloys, plastics and composites.

As noted earlier, the mandrel 24 can be selectively coupled to the flange 12. Selectively coupled means that a user can choose the relationship between the flange 12 and the mandrel 24. In one embodiment, the mandrel 14 and the flange 12 can be selectively coupled by a carriage 40 attached to the proximal end 24a of the mandrel 24 by, for example, bolts, fasteners or welding. The carriage 40 can be selectively coupled to the flange 12 such that the mandrel 24 can be held in static relation to the flange 12, or the mandrel 24 can be in dynamic relation to the flange.

As for the static mode, the carriage 40 and mandrel 24 can be held stationary relative to the flange 12 by a pin 42. Alternatively, the carriage 40 can be held stationary relative to the mandrel by one or more fasteners, such as bolt 46. Further, the bolt 46 can be held in place by a retainer plate 47 to prevent unwanted movement of the bolt 46. As for the dynamic mode, the carriage 40 can be in a sliding relation to the flange 12. In such case, a pair of rails 44 can be secured to the flange 12 so that the carriage 40 can slide on the rails 44. The movement of the carriage 40 on the pair of rails 44 can be achieved by tightening or loosening a bolt 46. In addition, the carriage 40 can be disengaged from the bolt 46 such that the carriage can be manually manipulated along the rails 22.

A pin 42 can be used to set the carriage 40 to a zeroed position, which should be done before mounting the fixture 10 to a combustor component. To zero the carriage 40, a block 48 is provided on the flange 12. The block 48 can include a tight tolerance hole (not shown) into which pin 42 can fit. Pin 42 can be sized so as to be matingly received within the tight tolerance hole. Similarly, the carriage 40 can include a hole 43 that must be aligned with the hole in the block 48 before the pin 42 can be installed. Such alignment can be achieved by adjusting bolt 46 by, for example, tightening or loosening the bolt 46. The block 48 can be secured to the flange 12 in various manners such as by screws or other fasteners.

Another possible component according to aspects of the present invention is a first positional gauge 50, such as a dial indicator, which can be secured to the flange 12. Preferably, at least a portion of the first dial indicator 50 is biased into contact with at least a portion of the carriage 40. Thus, when desired, the first positional gauge 50 can be used to measure the movement of the carriage 40.

The fixture 10 can include a first control rod 52 extending longitudinally through the mandrel 24. The first control rod 52 can have a proximal end and a distal end. A first user control knob 54 can be connected to the proximal end of the first control rod 52 by threaded engagement, adhesives or welding. A flared fitting 56 can be connected to the distal end of the first control rod 52 by, for example, threaded engagement. The inner tips 32 of the plurality of radially expandable jaws 28 can engage at least the flared fitting 56 at the distal end of the first control rod 52. The first control rod 52 can be substantially hollow.

The fixture 10 can further include a second control rod 58 extending longitudinally through the mandrel 24 and substantially coaxially within the first control rod 52. The second control rod 58 has a proximal end and a distal end. A second user knob 60 can be connected to the proximal end of the second control rod 58 in any of a variety of manners such as by threaded engagement. At its distal end, the second control rod 58 can extend beyond the flared fitting 56 of the first control rod 52. A second positional gauge 62, such as a dial indicator or any device that measures the distance from a center line, can be attached to the distal end of the second control rod 58. The second positional gauge 62 can be disposed substantially perpendicular to the second control rod 58. The second positional gauge 62 can be positioned so as to engage and peripherally sweep the interior peripheral wall of a transition duct.

The first user control knob 54 can be operated by a user, such as by turning or pushing, so as to cause axial movement of the first control rod 52. When the first control rod 52 moves axially, the second control rod 58 can move along with it in the axial direction. The axial movement of the first and second control rods 52,58 causes the flared fitting 56 to move axially as well.

Again, the inner tips 32 of the jaws 28 can substantially engage the flared fitting 56. As the outer surface of the fitting 56 flares outward, the jaws 28 will be forced follow the outer contour of the flared fitting 56. Thus, the jaws 28 will extend radially outward. On the other hand, when the flared fitting 56 is moved in the opposite axial direction, the outer surface of the fitting 56 narrows, and the inner tips 32 of the jaws 28 will remain substantially engaged with the flared fitting 56 because of the biasing force of the spring 36. To prevent rotation of the flared fitting 56, a groove (not shown) can be provided in the flared fitting 56 within which an anti-rotation strip 63 can extend. The anti-rotation strip 63 can be attached to the plate 30 by one or more fasteners.

The second user control knob 60, disposed substantially concentric relative to the first control knob 54, can be operated by a user, such as by turning, so as to cause the second control rod 58 to rotate within the first control rod 52. Bearings (not shown) can be provided between the first and second control rods 52,58 to facilitate rotation. Since the second positional gauge 62 is secured to the distal end of the second control rod 58, the rotation of the second control rod 58 can result in the second positional gauge 62 making a substantially circumferential sweep. The second control rod 58 can rotate in both the clockwise and counterclockwise directions.

Having described the individual components of the fixture 10 and their assembly according to aspects of the present invention, one illustrative manner in which such a fixture can be used to align the inlet end of a transition with a combustor component will be described below. The following description is merely an example of a sequence in which the individual steps can occur. The described steps can be performed in almost any order and not every step described must occur.

Figure 5:
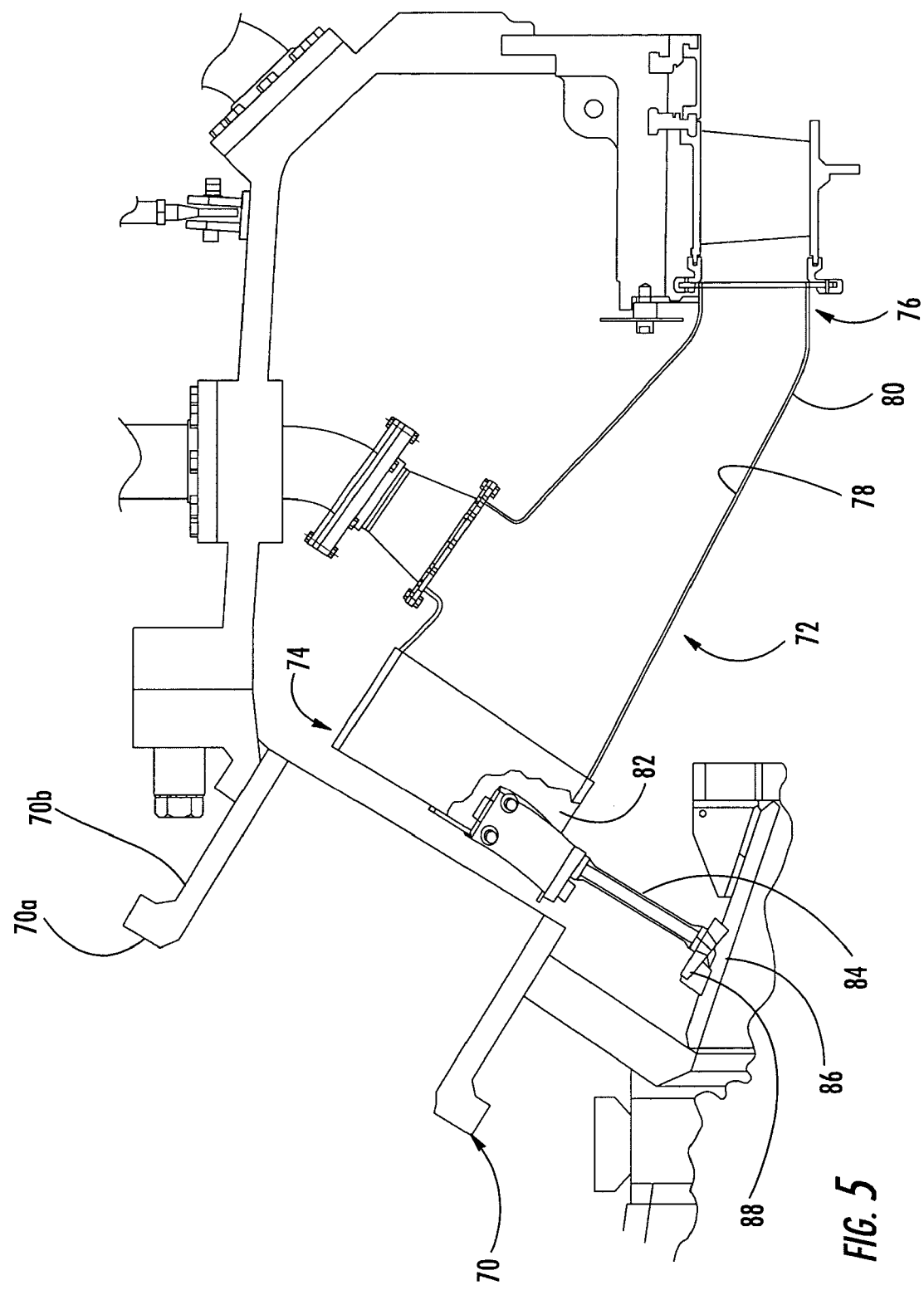
FIG. 5 is a cross-sectional view through the combustor section, partly disassembled, of a turbine engine.

One example of the combustor section of a turbine engine in which the alignment of the inlet end of the transition can be performed is shown, in a partially disassembled state, in FIG. 5. The combustor section can include a combustion cylinder or portal 70 having a flange portion 70a transitioning into a hollow body portion 70b. A generally hollow transition duct 72 can also provided. The transition duct 72 can have an inlet end 74, an outlet end 76, an inner peripheral surface 78 and an outer peripheral surface 80. The inlet end 74 of the transition 72 can include an inlet ring 82. Also, a flexible support bracket 84, which generally extends between the inlet end 72 of the transition and a surface 86 in the combustor section of the turbine engine. The bracket 84 can support at least a portion of the inlet end 74 of the transition 72. The bracket 84 can be loosely fastened, using bolts or other fasteners, to the transition 72 and to the combustor surface 86 so that the bracket 84 can be adjustably positioned.

In addition, a fixture 10 according to aspects of the invention discussed earlier is provided. The fixture 10 can have a flange 12, an elongated mandrel 24, and a plurality of radially extendable jaws 28. The flange 12 can be adapted for mounting to a corresponding surface on a combustor portal 70, such as the flange portion 70a, so as to substantially center the fixture 10 on the portal 70. The elongated mandrel 24 can have proximal 24a and distal ends 24b. The mandrel 24 can be selectively coupled to and extending away from the flange 12 along a target axis of alignment. The plurality of radially extendable jaws 28 can be coupled to the distal end 24b of the mandrel 24. Each of the plurality of jaws 28 can include an inner tip 32 and an outer tip 34. The outer tips 34 can be radially extendable in a cooperative manner so as to maintain a substantially equal radial distance from the target axis of alignment.

Figure 6:
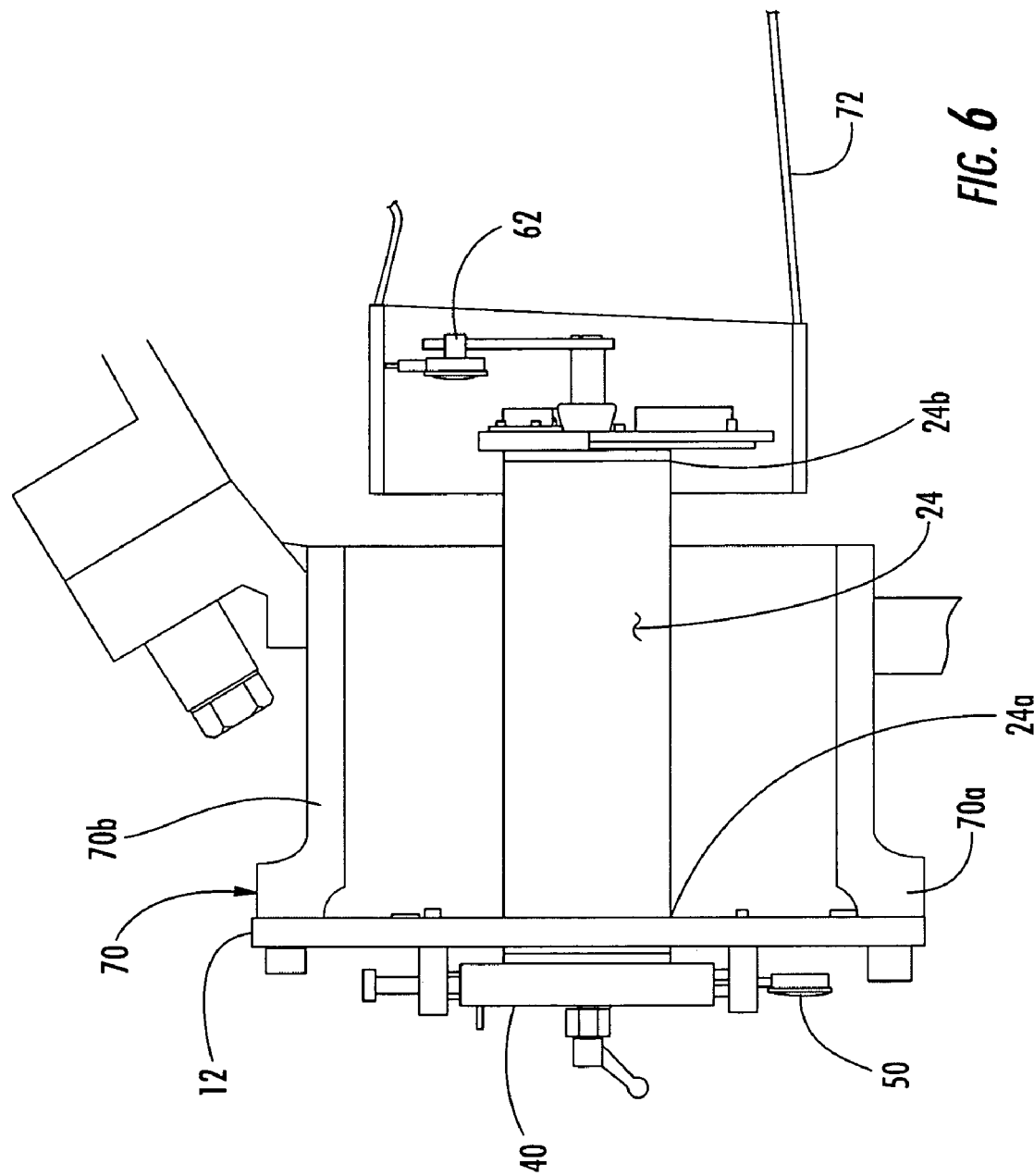
FIG. 6 is a cross-sectional view of through a portion of the combustor portal and transition, showing a transition alignment fixture according to aspects of the invention mounted to the portal and extending into the inlet end of the transition, the jaws being in a retracted position.

The fixture 10 can be secured to the combustor portal 70 by attaching the flange 12 of the fixture 10 to flange portion 70a of the combustor portal 70, using fasteners like bolts, such that at least a portion of distal end 24b of the mandrel 24 and the jaws 28 extend beyond the body portion 70b of the combustor portal 70. The inlet end 74 of the transition 72 can then be placed over the extending portion of the mandrel 24, as shown in FIG. 6.

Figure 7:
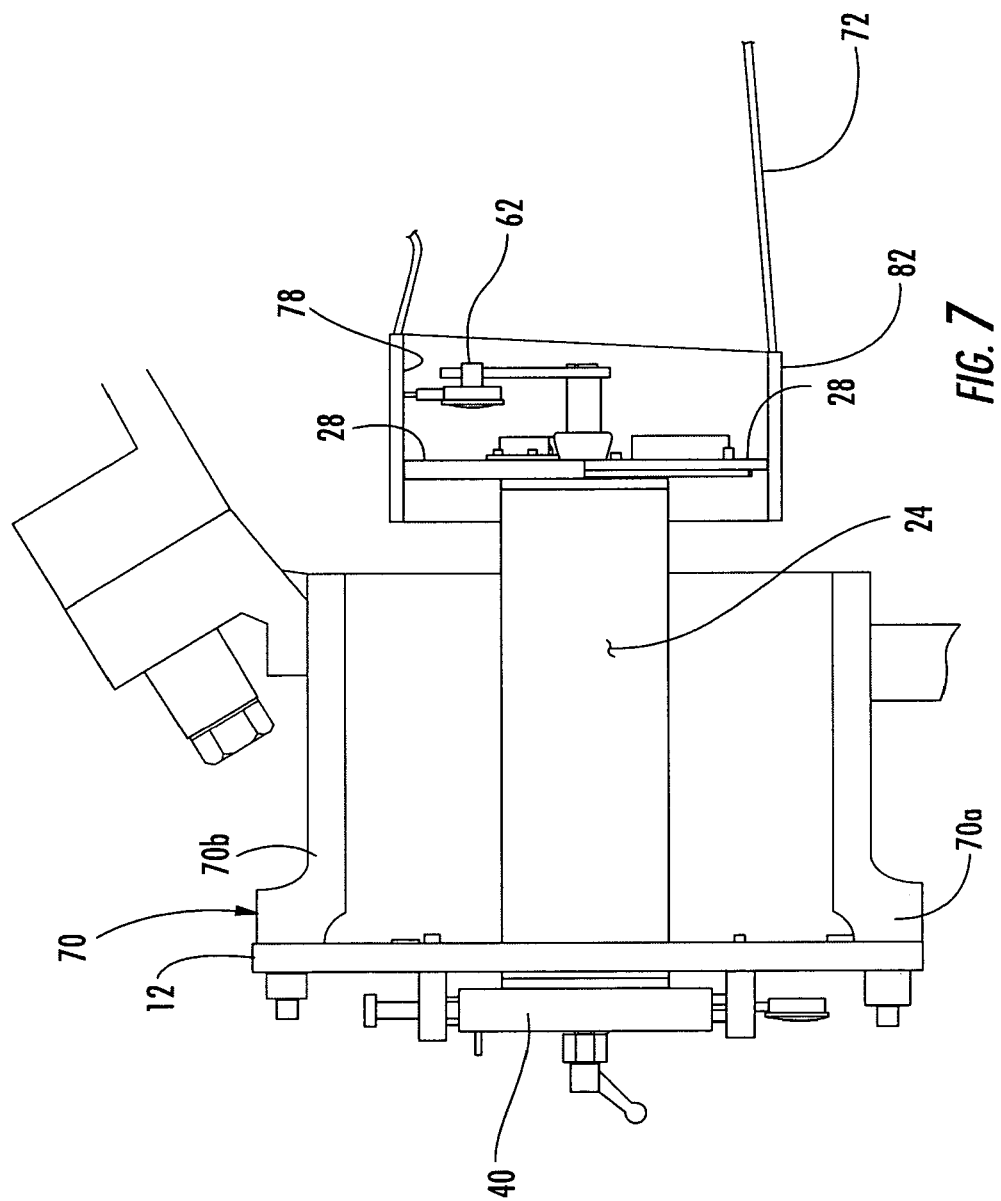
FIG. 7 is a cross-sectional view of through a portion of the combustor portal and transition, showing a transition alignment fixture according to aspects of the invention mounted to the portal and extending into the inlet end of the transition, the jaws being in an extended position.

The plurality of jaws 28 can be extended radially outward such that each of the outer tips 34 substantially engage the inner periphery 78 of the transition 72 as shown in FIG. 7. Thus, the inlet end 74 of the transition 72 can be held substantially along the target axis of alignment. When the inlet end 74 of the transition 72 is in such a position, any gap between the bracket base 88 and the combustor surface 86 must be measured so that the appropriate shim can be installed to support the transition 72 at the correct height. There are at least two ways of determining the needed shim.

One method does not use the fixture 10 at all. Instead, the gap between the bracket base 88 and the combustor surface 86 can be measured using, for example, taper gauges. Measurements can be taken on both sides of the bracket base 88. Once the measurements are taken, one or more shims can be installed between the flexible support base 88 and the combustor surface 86.

Another method of determining the required shim size is to zero the first positional gauge 50. Next, the carriage 40 can be selectively decoupled from the flange 12 such that the carriage 40 can be moved on the rails 44. The carriage 40 can be moved downward or radially away from the target axis of alignment until the bracket 84 and/or the bracket base 88 bottoms out on the combustor surface 86. Thus, a reading can be taken from the first positional gauge 50, which should reflect the distance that the carriage 40 has moved. With this information, the appropriate size shim can be selected, and one or more shims can be installed between the bracket base 88 and the combustor surface 86 in accordance with the measurements of the first positional gauge 50.

Once the shims are sized and installed, regardless of the specific method used to determine the needed shim size, the bracket 84 can be bolted firmly to the combustor surface 86. The position of the inlet end 74 of the transition 72 can be verified by using the second positional gauge 62 to sweep the inner peripheral surface 78 of the transition 72. Then, the plurality of jaws 28 can be retracted out of engagement with the inner peripheral surface 78 of the transition 72 so that the fixture 10 can be removed from the combustor component 70.

It will of course be understood that the invention is not limited to the specific details described herein, which are given by way of example only, and that various modifications and alterations are possible within the scope of the invention as defined in the following claims.

What is claimed is:

1. A fixture for aligning the inlet end of a transition with a combustor component in a turbine engine comprising:
    a flange adapted for mourning to a combustor component;
    an elongated mandrel having proximal and distal ends, the mandrel being selectively coupled to and extending away from the flange along a target axis of alignment; and
    a plurality of radially extendable jaws coupled to the distal end of the mandrel, each of the plurality of jaws including an inner tip and an outer tip, wherein each outer tip translates radially in a direction substantially perpendicular to the target axis of alignment and in a cooperative manner such that each of the outer tips translates a substantially equal radial distance from the target axis of alignment;
    whereby the outer tips engage an inner peripheral surface of a transition so that the transition is properly located to the target axis of alignment.

2. The fixture of claim 1 wherein the flange includes at least one protrusion for centering the fixture on a combustor component.

3. The fixture of claim 1 further including a plate secured to the distal end of the mandrel, the plurality of radially extendable jaws being movably retained on the plate.

4. The fixture of claim 1 wherein the plurality of radially extendable jaws are biased radially inward.

5. The fixture of claim 1 wherein the mandrel is selectively coupled to the flange by a carriage attached to the proximal end of the mandrel, the carriage is selectively coupled to the flange such that the mandrel is held in one of a fixed relation to the flange or a sliding relation to the flange.

6. The fixture of claim 5 wherein the carnage is held in fixed relation to the flange by at least a bolt.

7. The fixture of claim 5 further including a pair of rails secured to the flange, wherein the carriage slidably engages the pair of rails.

8. The fixture of claim 5 further including a first positional gauge secured to the flange so as to substantially engage at least a portion of the carriage, wherein the first positional gauge measures movement of the carriage.

9. The fixture of claim 1 further including a first control rod extending longitudinally through the mandrel, the first control rod having a proximal end and a distal end, a first user control knob being connected to the proximal end of the first control rod, a flared fitting being connected to the distal end of the first control rod, wherein the inner tips of the plurality of radially expandable jaws engage at least the flared fitting.

10. The fixture of claim 9 wherein actuation of the first user control knob causes axial movement of the first control rod.

11. The fixture of claim 9 further including a second control rod extending longitudinally through the mandrel, the second control rod having a proximal end and a distal end, a second user knob being connected to the proximal end of the second control rod.

12. The fixture of claim 11 wherein at least a portion of the second control rod is disposed substantially coaxially within the first control rod.

13. The fixture of claim 11 wherein at least a portion of the second control rod is rotatable.

14. The fixture of claim 9 wherein a second positional gauge is attached to the distal end of the second control rod, the second positional gauge being circumferentially rotatably positioned so as to sweep inside of the transition.

15. A method of aligning the inlet end of a transition with the combustor section of a turbine engine comprising the steps of:
(a) providing a combustor portal having a flange portion transitioning into a hollow body portion,
(b) providing a generally hollow transition duct having an inlet end, an outlet end, and an inner periphery;
(c) providing a bracket for supporting at least a portion of the inlet end of the transition, the bracket extending between the inlet end of the transition and a surface of the combustor section of the turbine engine;
(d) fastening the bracket to the transition and the combustor surface so that the bracket can be adjustably positioned;
(e) providing a fixture having a flange, an elongated mandrel, and a plurality of radially extendable jaws, the flange being adapted for mounting to a corresponding surface on the combustor portal so as to substantially center the fixture on the portal, the elongated mandrel having proximal and distal ends, the mandrel being selectively coupled to and extending away from the flange along a target axis of alignment, and the plurality of radially extendable jaws coupled to the distal end of the mandrel, each of the plurality of jaws including an inner up and an outer tip, wherein the outer tips are radially extendable in a cooperative manner so as to maintain a substantially equal radial distance from the target axis of alignment;
(f) securing the fixture to the combustor portal by attaching the flange of the fixture to the flange portion of the combustor portal such that at least a portion of the distal end of the mandrel including the jaws extends beyond the body portion of the combustor portal;
(g) placing the inlet end of the transition so as to receive the at least a portion of the distal end of the mandrel including the jaws; and
(h) extending the plurality of jaws radially outward such that each of the outer tips engage the inner periphery of the transition, wherein the inlet end of the transition is held substantially along the target axis of alignment.

16. The method of claim 15 further including the steps of:
(i) measuring the gap between a portion of the bracket and the combustor surface; and
(j) installing one or more shims between a portion of the bracket and the combustor surface.

17. The method of claim 16 further including the steps of:
(k) securing the bracket to the combustor surface;
(l) radially retracting the plurality of jaws out of engagement with the inner periphery of the transition; and
(m) removing the fixture from the combustor component.

18. The method of claim 15 wherein the mandrel is selectively coupled to the flange by a carriage attached to the proximal end of the mandrel, wherein the carriage is selectively coupled to the flange such that the mandrel is held in one of a fixed relation to the flange or a sliding relation to the flange, and wherein the fixture further includes a first positional gauge that operatively engages the carriage, and further including the steps of:
(n) zeroing the first positional gauge;
(o) selectively decoupling the carnage from rite flange;
(p) moving the carriage away from the axis of alignment until the bracket engages the combustor surface;
(q) using the first positional gauge to measure the movement of the carriage; and
(r) installing one or more shims between the bracket and the combustor surface in accordance with the measurement of the first positional gauge.

19. The method of claim 18 further including the steps of:
(s) securing the bracket to the combustor surface;
(t) radially retracting the plurality of jaws out of engagement with the inner periphery of the transition; and
(u) removing the fixture form the combustor component.

20. In combination, a generally hollow transition duct and a fixture for aligning the inlet end of a turbine engine transition comprising:
the generally hollow transition duct having an inlet end, an outlet end, and an inner periphery; and
the fixture having a flange, an elongated mandrel, and a plurality of jaws, wherein the mandrel is selectively coupled to and extends away from the flange along a target axis of alignment, the mandrel having proximal and distal ends, wherein the plurality of jaws are coupled to the distal end of the mandrel, each of the plurality of jaws including an inner tip and an outer tip, wherein the plurality of jaws are received in the inlet end of the transition duct, wherein each outer tip translates radially outward relative to the target axis of alignment and in a cooperative manner such that each of the outer tips translates a substantially equal radial distance from the target axis of alignment such that each outer tip engages the inner periphery of the transition duct, whereby the transition duct is properly located to the target axis of alignment.

* * * * *